United States Patent
Noguchi

(10) Patent No.: US 9,658,922 B2
(45) Date of Patent: May 23, 2017

(54) COMPUTER-READABLE RECORDING MEDIUM HAVING STORED THEREIN PROGRAM FOR WRITE INSPECTION, INFORMATION PROCESSING DEVICE, AND METHOD FOR WRITE INSPECTION

(71) Applicant: FUJITSU LIMITED, Kawasaki-shi, Kanagawa (JP)

(72) Inventor: Yasuo Noguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 156 days.

(21) Appl. No.: 14/565,478

(22) Filed: Dec. 10, 2014

(65) Prior Publication Data

US 2015/0205652 A1 Jul. 23, 2015

(30) Foreign Application Priority Data

Jan. 22, 2014 (JP) ................................. 2014-009257

(51) Int. Cl.
| | |
|---|---|
| G06F 11/07 | (2006.01) |
| G06F 11/00 | (2006.01) |
| G06F 3/00 | (2006.01) |
| G06F 11/10 | (2006.01) |
| G06F 3/06 | (2006.01) |

(52) U.S. Cl.
CPC .......... G06F 11/1048 (2013.01); G06F 3/06 (2013.01)

(58) Field of Classification Search
None
See application file for complete search history.

(56) References Cited

U.S. PATENT DOCUMENTS

| | | | |
|---|---|---|---|
| 8,665,545 B2 * | 3/2014 | Coker | ................ G11B 19/045 360/31 |
| 2006/0179215 A1 | 8/2006 | Mochizuki et al. | |
| 2006/0179217 A1 | 8/2006 | Ito et al. | |
| 2007/0101182 A1 | 5/2007 | Takahashi et al. | |
| 2010/0199126 A1 | 8/2010 | Noguchi et al. | |
| 2011/0154058 A1 * | 6/2011 | Hyerle | .................... G06F 21/64 713/189 |

FOREIGN PATENT DOCUMENTS

| | | |
|---|---|---|
| JP | 2006-252530 | 9/2006 |
| JP | 2007-122476 | 5/2007 |
| JP | 2010-182087 | 8/2010 |

* cited by examiner

*Primary Examiner* — Justin R Knapp
(74) *Attorney, Agent, or Firm* — Fujitsu Patent Center

(57) ABSTRACT

An information processing device that inputs and outputs data into and from a storage device having a plurality of regions, and includes a processor that: changes a first counter value corresponding to a first region serving as a writing target and being retained in a retainer retaining multiple counter values one representing the number of times of data writing into each of the regions; obtains the first counter value from the retainer; generates block data by attaching the first counter value to data to be written into the first region; writes the block data into the first region; when the first counter value satisfies a predetermined condition, reads the block data from the first region after the writing, and compares the read block data with the block data written into the first region, and when the read block data does not match the written block data, notifies an error.

12 Claims, 6 Drawing Sheets

FIG. 6
— Related Art —

LOST-WRITE DETECTABILITY OF CONTROLLER WHEN n=2

| | CORRECT VALUE | BLOCK VALUE | COUNTER VALUE OF BLOCK | COUNTER VALUE FOR COMPARING | DETECTABILITY |
|---|---|---|---|---|---|
| INITIAL STATE | D0 | D0 | 0 | 0 | |
| LOST WRITE | D1 | D0 | 0 | 1 | POSITIVE |
| LOST WRITE | D2 | D0 | 0 | 2 | POSITIVE |
| LOST WRITE | D3 | D0 | 0 | 3 | POSITIVE |
| LOST WRITE | D4 | D0 | 0 | 0 | NEGATIVE |

COMPUTER-READABLE RECORDING MEDIUM HAVING STORED THEREIN PROGRAM FOR WRITE INSPECTION, INFORMATION PROCESSING DEVICE, AND METHOD FOR WRITE INSPECTION

CROSS-REFERENCE TO RELATED APPLICATION

This application is based upon and claims the benefit of priority of the prior Japanese Patent application No. 2014-009257, filed on Jan. 22, 2014, the entire contents of which are incorporated herein by reference.

FIELD

The embodiment discussed herein is a computer-readable recording medium having stored therein a program for write inspection, an information processing device, and a method for write inspection.

BACKGROUND

A storing device such as a Hard Disk Drive (HDD) sometimes has, at a low possibility however, errors in writing data into the storing device in response to a write command from a host device. Examples of the errors are a wrong address that the data is written into a different address from an address instructed by the command and lost write that data is not written into the instructed address. A wrong address is caused when head seek in the HDD has failed or the like; and lost write is caused when data writing has been carried out in a state where the HDD head comes apart from the disk to lower the magnetic force therebetween.

As described above, causes of a wrong address and lost write (hereinafter also collectively referred to as a "writing error") in an HDD frequently depend on the state of the HDD. This makes a controller that controls accesses to the HDD difficult to detect a writing error that occurs after the controller instructs data writing into the HDD in response to a write command. Consequently, the controller sometimes has difficulty in notifying occurrence of a writing error to the host device.

One of the known methods to detect above writing errors uses, for example, a Block Check Code (BCC). A BCC is data used for detecting an error in data by means of Cyclic Redundancy Check (CRC). A BCC includes the result of CRC that the controller has performed on the data directed by a write command and information of the write address directed by the write command.

For example, in response to a read command from the host device, the controller compares the read address directed by the read command with address data included in the BCC of the block read from the HDD. In cases where the compared two addresses do not match, the controller detects that the block read from the HDD has been written therein data of a wrong address, which means that the read data is data that have to be written into another address.

However, simply using a BCC sometimes makes the controller difficult to detect that the data directed by the read command is written into a different address from the read address or has lost write. One of the above cases is that although data in the block directed by the read address is old data supposed to be overwritten with different (new) data, there is high possibility that address in the BCC in the same block is the correct read address and therefore the result of comparing the read addresses match.

In one of the related techniques known to public, the controller generates chronological data, such as a counter value, that makes it possible to discriminate the current write command from the latest write command into the same storing region (see, for example, Patent Document 1). In this technique, the controller provides the generated chronological data to each of updating data and parity data, writes the updating data and the parity data into different disks, compares the chronological data provided to the updating data with that provided to the parity data when reading data in response to the current write command, so that a possible writing error can be detected.

In another known related technique, the controller sets a history block that stores therein an updating state value such as the updated generation number for each block, and regards each history block as a management unit to be inspected (see, for example, Patent Document 2). In this technique, the controller calculates the updating state value for each management unit, stores the updating state value into a memory, and writes the entire management unit including the updating data and the updating state value into the disk. After that, the controller compares the updating state value read from the disk with the updating state value stored in the memory to detect lost write on the disk.

As the above, there have been provided known techniques that the controller compares the counter value (updated generation number) stored in the disk with the counter value for comparing stored in a different disk or a memory and, when the counter values do not match, detects the occurrence of a writing error. These techniques are capable of detecting a wrong address that the data is written into a different address from an address instructed by the read command and lost write that data is not written into the instructed address.

[Patent Document 1] Japanese Laid-open Patent Publication No. 2010-182087

[Patent Document 2] Japanese Laid-open Patent Publication No. 2006-252530

[Patent Document 3] Japanese Laid-open Patent Publication No. 2007-122476

In the above technique, the chronological data and the updating state value, which are stored into the storing region of the HDD, may suppress the available disk volume, that is the disk volume that can store the business data (user data), depending on the data size of the chronological data and the updating state value. In particular, the technique that generates chronological data and writes such chronological data corresponding to each block largely suppresses the available disk volume in accordance with an increase in data size of chronological data.

A solution to the above minimizes the chronological data and the updating state value to reserve an available disk volume. Here, the chronological data and the updating state value are assumed to be a counter value. An example of a counter value is represented by an n-bit value (where n is an integer equal to or more than one) and is in the range of 0 to m (where $m=2^n-1$). In this solution, the counter small in size may have difficulty in detecting a wrong address and lost write as to be detailed below. The following description focuses on the occurrence of lost write, but the same description is applied to the occurrence of a wrong address.

FIG. 6 is a diagram denoting the lost-write detectability of the controller when the counter value is a two-bit data (n=2). In the example of FIG. 6 assumes that under a state where the value "D0" is set in the predetermined block having a counter value of "0" representing the initial state, write commands to each write values "D1", "D2", "D3", and "D4" are successively issued but all results in the occurrence of lost write.

As denoted in FIG. 6, even when lost write has occurred successive three times ("D1"-"D3"), the controller is capable of detecting the lost write by comparing the counter value of the predetermined block stored in the disk with the counter value for comparing.

However, in cases where lost write has occurred successive four times ("D1"-"D4"), the counter value for comparing overflows and the counter value for comparing is cleared (returns from three to the initial value zero), and the counter value for comparing comes to be the same as the counter value of the predetermined block. At that time, the controller determines the both counter values match and therefore does not determine that lost write has occurred. Having a smaller maximum value of the counter value, a counter having a smaller counter size has higher possibility that the counter value is the same as the counter value for comparing.

As the above, when a counter used for writing error inspection (writing inspection) is made to have a small size to reserve an available disk volume of the storing device, the controller sometimes has difficulty in detecting a writing error, which lowers the reliability of the writing inspection.

SUMMARY

According to an aspect of an embodiment, a computer-readable recording medium having stored therein a writing inspection program for causing a computer that inputs and outputs data into and from a storage device having a plurality of regions to execute a process for writing inspection, the process including: changing a first counter value corresponding to a first region serving as a writing target and being retained in a retainer, the retainer retaining a plurality of the counter values one representing the number of times of data writing into each of the plurality of regions; obtaining the first counter value of the first region from the retainer; generating block data by attaching the first counter value to data to be written into the first region; writing the block data into the first region; when the first counter value of the first region satisfies a predetermined condition, reading the block data from the first region after the writing, and comparing the read block data with the block data written into the first region, and when the read block data does not match the written block data, notifying an error.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram denoting lost-write detectability of a controller.

DESCRIPTION OF EMBODIMENTS

Hereinafter, a first embodiment will now be described with reference to the accompanying drawings.

Figure 1:
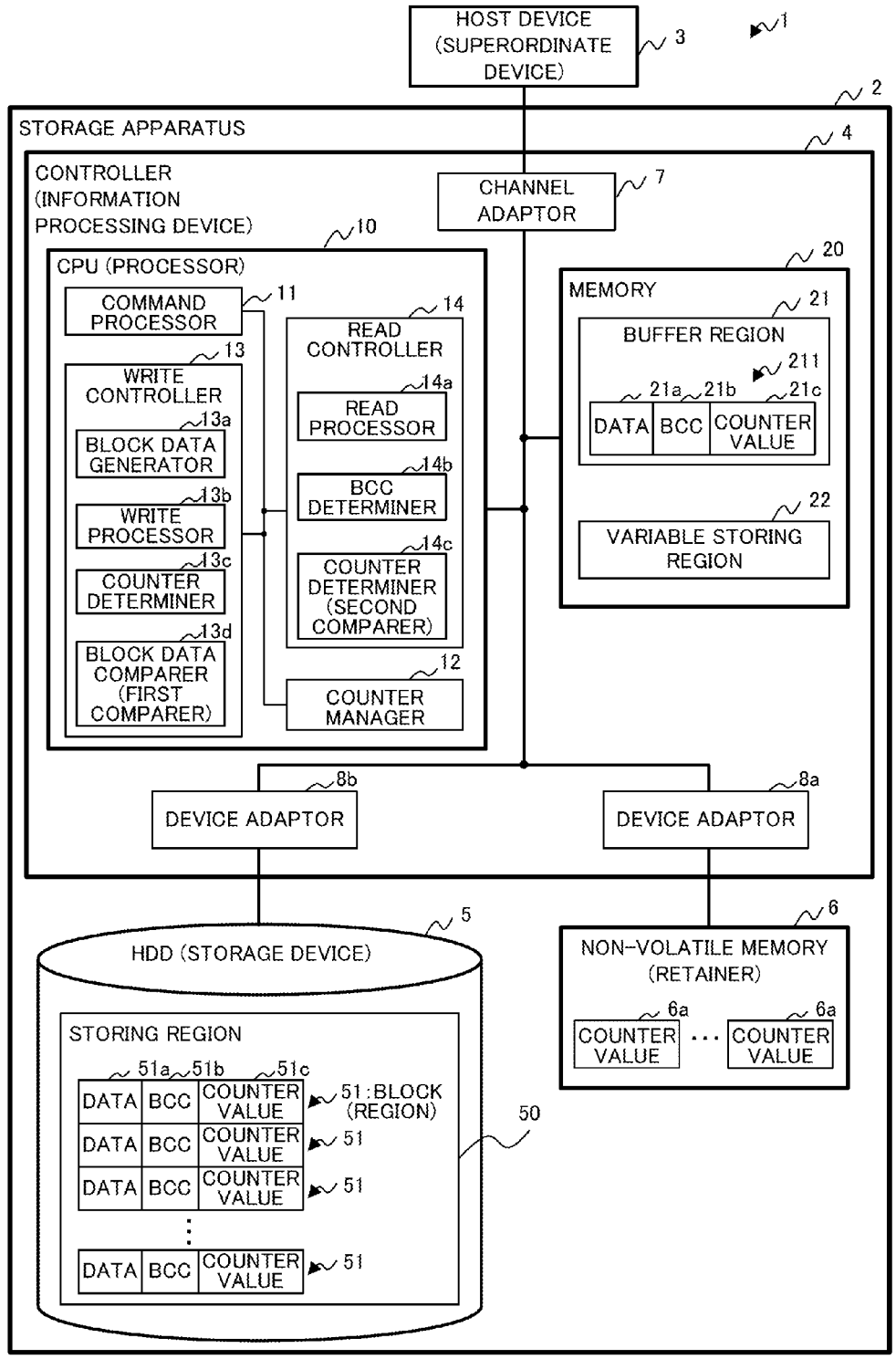
FIG. 1 is a block diagram schematically illustrating an example of the configuration of an information processing system according to a first embodiment.

(1) First Embodiment (1-1) Information Processing System:

FIG. 1 is a block diagram schematically illustrating an example of the configuration of the information processing system 1 according to the first embodiment.

As illustrated in FIG. 1, the information processing system 1 includes a storage apparatus 2 and a host device 3. The host device 3 is an information processing device such as a Personal Computer (PC) or a server and is an example of a superordinate device that issues a command for data writing or data reading (i.e., data writing command or data reading command) to the storage apparatus 2. The storage apparatus 2 includes a controller 4, at least one HDD 5, and a non-volatile memory 6.

The controller 4 accesses the HDD 5 for, for example, data inputting and outputting in response to a command from the host device 3, and controls management of a memory 20 that is to be detailed below, the non-volatile memory 6, and other resources. An example of the controller is an information processing device of a Controller Module (CM). The controller 4 will be detailed below.

The HDD 5 is an example of a storing device that stores therein various pieces of data and programs. An example of the storing device of the first embodiment is a magnetic disk device such as an HDD, but the storing device is not limited to an HDD. Any device that would have a write address miss and lost write can be used as the storing device. Although only one HDD 5 appears in FIG. 1, multiple HDDs 5 may be connected to the controller 4 via a device adaptor 8a.

The HDD 5 includes a storing region 50 having multiple blocks 51. The storing region 50 is a disk region that stores therein various pieces of data and programs. Each block (region) includes data 51a, a BCC 51b, and a counter value 51c. The controller 4 inputs and outputs data into and from the HDD 5 in a unit of the block size of the block 51.

The data 51a is data (user data) that is written by the controller 4 and that is related to a write command from the host device 3. The BCC 51b is information to be used for error detection in the data 51a by means of CRC. The BCC 51b includes the result of CRC performed on the data 51a directed by the write command and information of the write address directed by the write command.

The counter value 51c represents the number of times that the data 51a in the same block has been updated (i.e., the number of times that the data 51a has been written into the block 51). The counter value 51c is represented in the form of n bit data (where, n is an integer equal to or more than 1) and also is the range of 0 to m (where, $m=2^n-1$).

Since a BCC has a vender region that the vender can proprietarily set, the controller 4 may set the counter value 51c into the vender region in the BCC 51b. In this case, the data 51a and the BCC 51b (the combination of the BCC 51b and the counter value 51c) are assumed to be, for example, 512 bytes and 8 bytes, respectively, a single block 51 has a size of 520 bytes.

Alternatively, a setting region of the counter value 51c may be provided in a part of the data 51a or may be prepared in the block 51 except for the data 51a and BCC 51b.

The non-volatile memory 6 is an example of a retainer that retains a counter value 6a representing the number of times of writing into a block 51 included in the HDD 5 for each block 51. Each counter value 6a retained in the non-volatile memory 6 is an n-bit value corresponding to one of the blocks 51 in the HDD 51. Examples of the non-volatile memory 6 are a storing device such as a NAND flash memory or a Magnetoresistive Random Access Memory (MRAM), or a semiconductor drive device such as a Solid State Drive (SSD). A magnetic disk device such as an HDD 5 may be used as the non-volatile memory 6, but the non-volatile memory 6 is preferably the above storing device or semiconductor drive device for the data reliability aspect because the counter value 6a is used in comparison for writing error by the controller 4.

Figure 2:
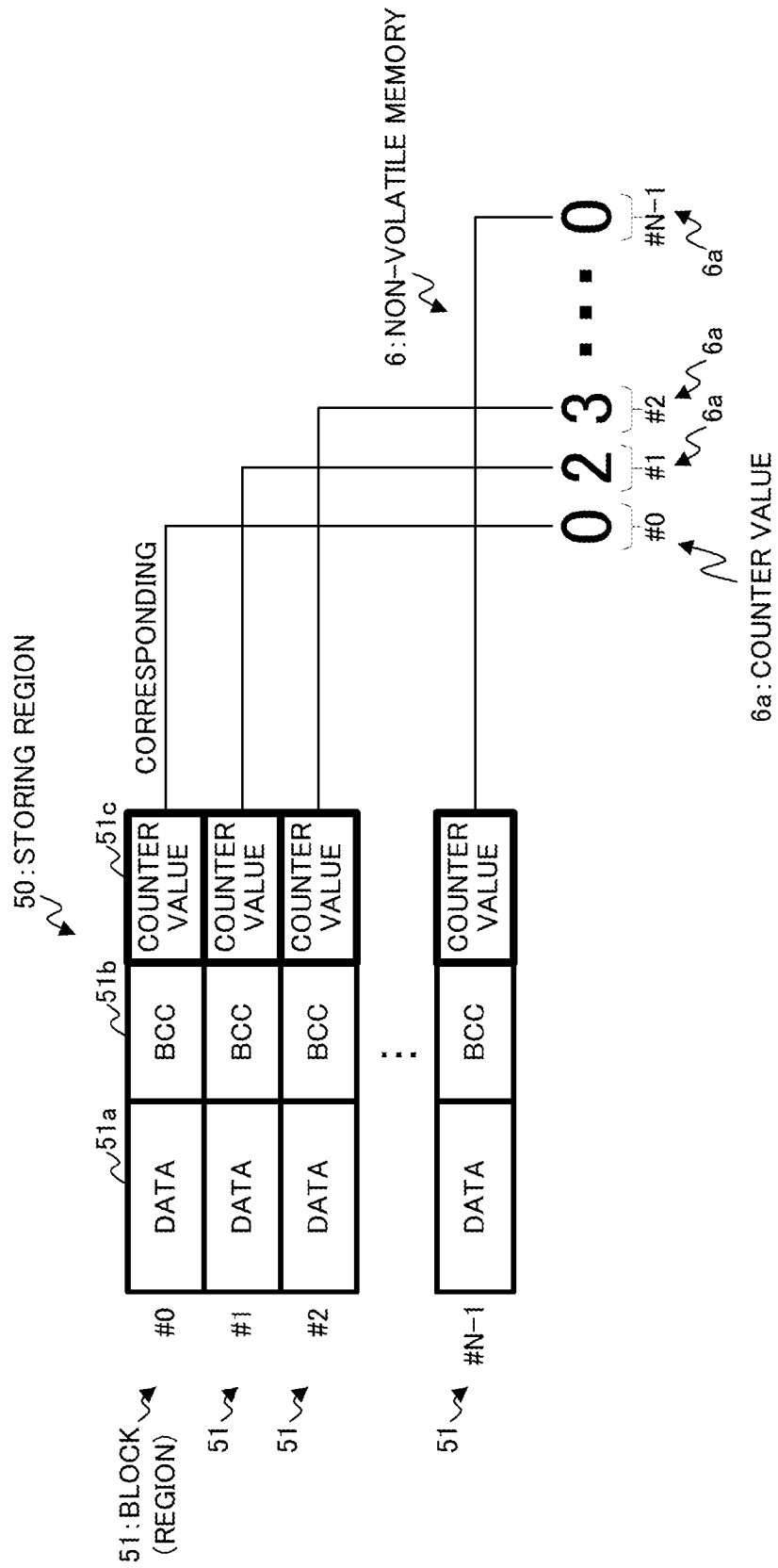
FIG. 2 is a diagram illustrating an example of a counter value retained in a non-volatile memory of FIG. 1.

FIG. 2 is a diagram denoting examples of multiple counter values 6a retained in the non-volatile memory 6 of FIG. 1. As illustrated in FIG. 2, when the HDD 5 includes N blocks 51 (where, N is an integer equal to or more than 2) collectively serving as the storing region 50, the non-volatile memory 6 retains N counter values 6a (#0 to #N−1) corresponding one to each of the counter values 51c (#0 to #N−1) of the N blocks 51. For example, as illustrated in FIG. 2, the non-volatile memory 6 can retain counter values 0(0b00), 2(0b10), 3(0b11), . . . , 0(0b00) being in bitmap values and corresponding to the blocks 51 numbered with #0, #2, . . . , #N−1, respectively.

(1-2) Controller:

Next, the controller 4 will now be detailed with reference to FIG. 1. As illustrated in FIG. 1, the controller 4 includes a Central Processing Unit (CPU) 10, a memory 20, a channel adaptor 7, and device adaptors 8a, 8b.

The channel adaptor 7 is a module that is connected to the host device 3 and that carries out interfacing control with the host device 3 to establish communication and data forwarding with the host device 3. The device adaptors 8a, 8b are modules that carry out interface control with the HDD 5 and the non-volatile memory 6 that are included in the storage apparatus 2, respectively, to establish communication and data forwarding with the HDD 5 and the non-volatile memory 6.

The CPU (processor) 10 is an example of a processing device (processor) that is connected to the blocks 20, 7, 8a, and 8b included in the controller 4 to carryout various controls and calculations. The CPU 10 achieves various functions by executing one or more programs that are stored in the memory 20 or a non-illustrated recording medium such as a Read Only Memory (ROM).

The memory 20 is a storing device, such as a cache memory, that temporarily stores therein various data and programs. In executing a program, the CPU 10 temporarily expands data and the program that are to be used into the memory 20. For example, the memory 20 can include a buffer region 21 and a variable storing region 22 as illustrated in FIG. 1. An example of the memory 20 is a volatile memory such as a RAM.

The buffer region 21 is a region that temporarily stores therein one or more pieces of block data 211 including write data that the host device 3 is to write into the HDD 5 or read data that is to be read from the HDD 5 to the host device 3. The block data 211 includes data 21a related to a write or read command, a BCC 21b, and a counter value 21c.

The variable storing region 22 is a region that stores therein various variables that are to be used in operation of the controller 4. For example, information representing a counter value 21c of the block data 211 that has been written from the buffer region 21 into the HDD 5 may be set in the variable storing region 22.

(1-3) Processor:

Next, description will now be made in relation to the respective functions of the processor achieved by the CPU 10.

As illustrated in FIG. 1, the CPU 10 includes functions of the processor including a command processor 11, a counter manager 12, a write controller 13, and a read controller 14.

The command processor 11 processes a read or write command communicated with the host device 3 via the channel adaptor 7 and a response to the command. For example, upon receipt of a write command from the host device 3, the command processor 11 notifies the write controller 13 of at least write data (updating data) and a write address directed by the received write command. In addition, upon received of a result of a writing process that the write controller 13 has carried out in response to the write command, the command processor 11 replies to the host device 3 with a normal response or an error response based on the result of the writing process. Furthermore, upon receipt of a read command from the host device 3, the command processor 11 notifies the read controller 14 of at least a read address and a read region directed by the read command. After that, upon receipt of a result of a reading process that the read controller 14 has carried out in response to the read command, the command processor 11 replies to the host device 3 with the read data and a normal response, or an error response, based on the result of the read process.

The counter manager 12 makes an accesses to the non-volatile memory 6 via the device adaptor 8a. Specifically, in response to a write or read command directed to one of the blocks 51 in the HDD 5, the counter manager 12 obtains a counter value 6a corresponding to the target block 51 from the non-volatile memory 6. For example, the counter manager 12 reads the counter value 6a corresponding to the target block 51 directed by the write or read command from the host device 3 in response to an instruction from the write controller 13 or the read controller 14, and notifies the read counter value 6a to the sender of the instruction.

The counter manager 12 changes the value of the counter value 6a in the non-volatile memory 6 in obedience to the write command directed to the target block 51 of the HDD 5. For example, the counter manager 12 adds one to the counter value 6a of the non-volatile memory 6 corresponding to the target block 51 directed by the write command from the host device 3. In cases where the addition of one to the counter value 6a causes the counter value 6a to reach a predetermined value (e.g., $2^n$), that is, in cases where the counter value 6a overflows as a result of the addition of one, the counter manager 12 resets (initializes) the counter value 6a to return to the initial value (e.g., 0(0b00)). The counter manager 12 may add (change by one) one to the counter value 6a before or after the counter value 6a is read. In cases where the counter manager 12 adds one to the counter value 6a in the non-volatile memory 6 after the counter value 6a in the non-volatile memory 6 is read, the counter manager 12 adds one to the counter value 6a that has been previously read.

The write controller 13 controls data writing into the HDD 5 in response to a write command from the host device 3. The write controller 13 may include, for example, a block data generator 13a, a write processor 13b, a counter determiner 13c, and a block data comparer 13d.

When the controller 4 receives a write command, the block data generator 13a generates block data 211 and temporarily stores the block data 211 into the buffer region 21 (block buffer) of the memory 20. Specifically, the block data generator 13a stores the write data notified by the command processor 11 into the buffer region 21 (data buffer), regarding the write data as data 21a. The block data generator 13a calculates CRC of the write data, generates a BCC 21b based on the result of the calculating of the CRC and the write address notified by the command processor 11, and stores the BCC 21b into the buffer region 21 (BCC buffer). The BCC 21b may be generated by any known method, so detailed description of the method is omitted here.

Furthermore, the block data generator 13a instructs to the counter manager 12 to obtain the counter value 6a in the non-volatile memory 6, the value 6a corresponding to the block 51 that the write address represents. Then, upon notification of the counter value 6a by the counter manager 12, the block data generator 13a stores the counter value 6a into the buffer region 21 to serve as the counter value 21c. The block data generator 13a generates block data 211 such that the counter value 21c has the same value of the counter value 6a corresponding to the write address in this way.

Upon notification of completion of generating the block data 211 from the block data generator 13a, the write processor 13b writes the block data 211 into the write address via the device adaptor 8b. Specifically, the write processor 13b writes the block data 211 (data 21a, BCC 21b, counter value 21c) into the target block (first region) 51 (data 51a, BCC 51b, counter value 51c) of the HDD 5, the block 51 being directed by the write address.

When the write processor 13b completes writing of the block data 211 into the HDD 5, the counter determiner 13c determines whether the counter values 21c of the block data 211 is the initial value (e.g., zero), i.e., whether the counter value 21c has been reset. In cases where the counter value 21c is not the initial value, the counter determiner 13c notifies the command processor 11 that the writing process into the HDD 5 responsive to the write command has been normally completed. This means that, when the counter value 21c is not the initial value, the counter value 21c does not overflow. Accordingly, even when a writing error of the block data 211 has occurred, the controller 4 is capable of detecting the writing error when the read data is read from the target block 51 (see "D1", "D2", "D3" in FIG. 6).

On the other hand, when the counter value 21c is the initial value, the counter determiner 13c instructs the block data comparer 13d to detect a writing error in the block data 211. Namely, the counter value 21c being the initial value means that the counter value 21c has overflown. Accordingly, in cases where a writing error of the block data 211 has occurred, it is difficult for the controller 4 to detect the writing error when the controller 4 reads data from the block 51 (see "D4" in FIG. 6). To compensate for the difficulty, the counter determiner 13c instructs the block data comparer 13d to inspect whether the block data 211 has been correctly written into the block (first region) of the writing target immediately after the write processor 13b writes the block data 211.

The counter determiner 13c can obtain the counter value 21c that is to be used for the above inspection from the buffer region 21, the variable storing region 22, or the non-volatile memory 6.

The block data comparer (first comparer) 13d reads information in the block 51 of the HDD 5 in response to the instruction from the counter determiner 13c, the block being indicated by the write address. Then, the block data comparer 13d stores the read data, being regarded as the block data 211 (read block data), into the buffer region 21 (block buffer). The block data comparer 13d stores the read block data read from the block 51 into a region in the buffer region 21 different from the region storing therein the block data 211 (write block data) that the write processor 13b has written into the block of the writing target.

Unless a writing error has occurred, the read block data read by the block data comparer 13d matches the block data 211 (write block data) written by the write processor 13b. For the above, the block data comparer 13d compares the write block data stored in the buffer region 21 with the read block data and determines whether the write block data matches the read block data. Namely, the block data comparer 13d carries out read after write that reads data from the block 51, into which data has been written by the write processor 13b, and compares the written data and the read data, in response to the instruction from the counter determiner 13c.

The above determination by the block data comparer 13d is satisfactorily accomplished through comparison of at least part of the block data. For example, the data to be compared may be at least one or a combination of two of a block data 211, a BCC 21b, and a counter value 21c of each of the write and read block data. Alternatively, the part data to be compared for the determination may be CRCs of the data 21a and the BCC 21b.

In cases where the write block data matches the read block data, the block data comparer 13d notifies the command processor 11 that the writing process into the HDD 5 in response to the write command has been correctly accomplished. In contrast, in cases where the write block data does not match the read block data, the block data comparer 13d notifies the command processor 11 that the writing error has occurred in the writing process into the HDD 5 in response to the write command.

As the above, since the counter value 51c is written into the storing region 50 of the HDD 5, the data volume of the counter value 51c suppresses the available disk volume (for storing user data) of the HDD 5, that is, storing region for data 51a in all the blocks 51. In particular, when the counter value 51c for each block 51 is written in order to detect a writing error in a unit of the block 51, increase in the counter size largely decreases the available disk volume.

Conversely, a smaller counter size to reserve an available disk volume of the HDD 5 sometimes makes the controller 4 difficult to detect a writing error as described with reference to FIG. 6, leading to lowering the reliability of the writing inspection.

As a solution to the above, when the counter value 21c corresponding to a block 51 of the writing target satisfies a predetermined condition, which specifically is that the counter value 21c has been reset, the write controller 13 of the first embodiment writes and reads data from and into the block (first region) 51 of the writing target. Then the write controller 13 compares the block data 211 written into the block with data read from the block 51 after the writing and in cases where the written data does not match the read data, the write controller 13 replies to the host device 3 with an error response (error notification) via the command processor 11.

Even if the counter has only a small data volume (n), the write controller 13 is capable of detecting successive writing errors. The write controller 13 reserves the storing region for user data (data 51*a*) in the HDD 5 and improves the reliability of the writing error inspection compatible with each other.

Since the controller 4 of the first embodiment can ensure the reliability of the writing error inspection even when the counter has a small size, the counter value 51*c* small in size can be set in an empty region of each block 51. For example, the controller 4 can include the counter value 21*c* in, for example, the vender region of the BCC 21*b* that serves as information (BCC 21*b*) used for error detection among the data to be written into the block 51 of the writing target, so that the block data 211 can be generated. This makes it possible to increase the storing region of the data 51*a* and increase the number of blocks 51 in the storing region 50, and consequently the available disk volume can further be increased.

Since the controller 4 of the first embodiment can ensure the reliability of the writing error inspection even when the counter has a small size, the non-volatile memory 6 that stores therein multiple counter values 6*a* can have a small size. This can reduce the circuit size and also the production cost.

The read data and the written data are compared when the counter value 21*c* corresponding to the block 51 of the writing target is reset. Alternatively, the block data comparer 13*d* may carry out adopt the "read after write" scheme each time the writing data into the HDD 5 is accomplished. However, the read after write scheme takes an additional time for seeking the magnetic head for reading the data, reading the data, and comparing the written data and the read data to the time that the simple writing process takes. Accordingly, the read after write performed each time the writing data into the HDD is accomplished remarkably lowers the throughput of the storage apparatus 2. In contrast, the block data comparer 13*d* of the first embodiment can minimize the execution of the read after write and thereby avoid lowering of the throughput of the storage apparatus 2.

Next, the read controller 14 will now be detailed.

The read controller 14 controls data reading from the HDD 5 in response to the read command from the host device 3, and includes, for example, a read processor 14*a*, a BCC determiner 14*b*, and a counter determiner 14*c*.

When the controller 4 receives a read command, the read processor 14*a* reads information in a block (second region) 51 of the reading target in the HDD 5 and temporarily stores the read data into the buffer region 21. Specifically, the read processor 14*a* specifies the block 51 of the reading target based on a read address and a read region that are notified from the command processor 11. The read processor 14*a* reads the data 51*a*, the BCC 51*b*, and the counter value 51*c* from the block 51 of the reading target, and stores the pieces of the read data, serving as the block data 211, into the buffer region 21 (block buffer).

The BCC determiner 14*b* carries out BCC inspection on the read block data stored in the buffer region 21 by the read processor 14*a*. Specifically, the BCC determiner 14*b* compares the read address associated with the read command notified by the command processor 11 with the address data included in the BCC 21*b* of the read block data. In cases where the two addresses do not match, the BCC determiner 14*b* detects that a writing error has occurred in the latest writing into the block 51 of the reading target. Thereby, the BCC determiner 14*b* detects that the data 51*a* of a wrong address is written in the block 51 read from the HDD 5, that is, detects that the read data 51*a* has to be written in a different address. The BCC determiner 14*b* notifies the command processor 11 of the detection of the writing error in the block 51 of the reading target in the course of a reading process from the HDD 51 carried out in response to the read command.

On the other hand, in cases where the two addresses match, the BCC determiner 14*b* determines that the BCC inspection has not detected a writing error and instructs the counter determiner 14*c* to inspect a writing error based on the counter value. As described above, the BCC inspection sometimes has difficulty in detecting that data requested by a read command is mistakenly written in a different address from the read address or that the data requested by the read command has lost write. If the compared addresses match, the BCC determiner 14*b* instructs the counter determiner 14*c* to inspect whether the read block data is correct data requested by the read command.

Upon receipt of the instruction from the BCC determiner 14*b*, the counter determiner (second comparer) 14*c* instructs the counter manager 12 to obtain counter value 6*a* associated with the block (second region) 51 indicated by the read address from the non-volatile memory 6. Upon receipt of the notification of the counter value 6*a* from the counter manager 12, the counter determiner 14*c* compares the counter value 6*a* with the counter value 21*c* in the read block data stored in the buffer region 21.

In cases where the compared two counter values match, the counter determiner 14*c* notifies the command processor 11 of the normal completion of the reading data process on the HDD 5 carried out in response to the read command.

In contrast, in cases where the compared two counter values do not match, the counter determiner 14*c* detects that a writing error has occurred in the latest writing into the block 51 of the reading target. After that, the counter determiner 14*c* notifies the command processor 11 of detection of the writing error in the block 51 of the reading target in the reading process on the HDD 5 carried out in response to the read command.

In notification of the response to the read command to the command processor 11, the read controller 14 also notifies the command processor 11 of at least partial data of the block data 211 (read block data) stored in the buffer region 21. In cases where the response to the read command represents the detection of a writing error (i.e., error response), the read controller 14 does not have to notify of the command processor 11 of the read block data.

Here, the number of blocks 51 that the storage apparatus 2 accesses when writing and reading data into and from the HDD5 is compared with the number of blocks a controller accesses when carrying out the similar process in the above related technique. The related technique here assumes that the controller provides history blocks one storing therein a state of updating each of multiple blocks and regards the history blocks as management units to be inspected.

The related technique uses, for example, a time stamp, the number of updated generations, a check code of the entire management unit as an updating state value. In cases where a check code is used, the controller has difficulty in detecting lost write in the entire management unit. Hereinafter, to conform to the conditions of the storage apparatus 2, the related technique uses the number of updated generations as the value representing the updating state value.

The controller 4 of the storage apparatus 2 and the controller of the related technique each access the following blocks in the HDD when reading and writing data from and into the HDD. In the following comparison, the terms of (read) and (write) represent the type of access to a block.

blocks in a disk accessed when reading
the related technique: block of the reading target (read)+block storing therein an updating state value (read)
the storage apparatus 2: block 51 of the reading target (read)
blocks in a disk accessed when writing
the related technique: block of the writing target (write)+block storing therein an updating state value (write)
the storage apparatus 2
(when the counter value 21c is 0): block of the writing target (write)+block 51 of the writing target (read)
(when the counter value 21c is not 0): block 51 of the writing target (write)

As understood from the above, in the both cases of reading and writing, the storage apparatus 2 can reduce the access frequency to blocks as compared with the related technique. Since the storage apparatus 2 writes and reads data into and from the block 51 of the writing target in the read after write scheme when the writing process is being carried out (i.e., when the counter value 21c is zero), the number of blocks to be accessed by the storage apparatus 2 is the same as that of related technique. The probability that the counter value 21c comes to be 0 is ¼ when the counter value 21c is a two-bit value (n=2) and ⅛ when the counter value 21c is a three-bit value (n=3), which are limited as compared with the related technique, which always writes data into two blocks.

As described above, the storage apparatus 2 according to the first embodiment can reduce the access frequency to the block 51 when writing and reading data into and from the HDD 5, and thereby improves the throughput as compared with the above related technique.

Figure 3:
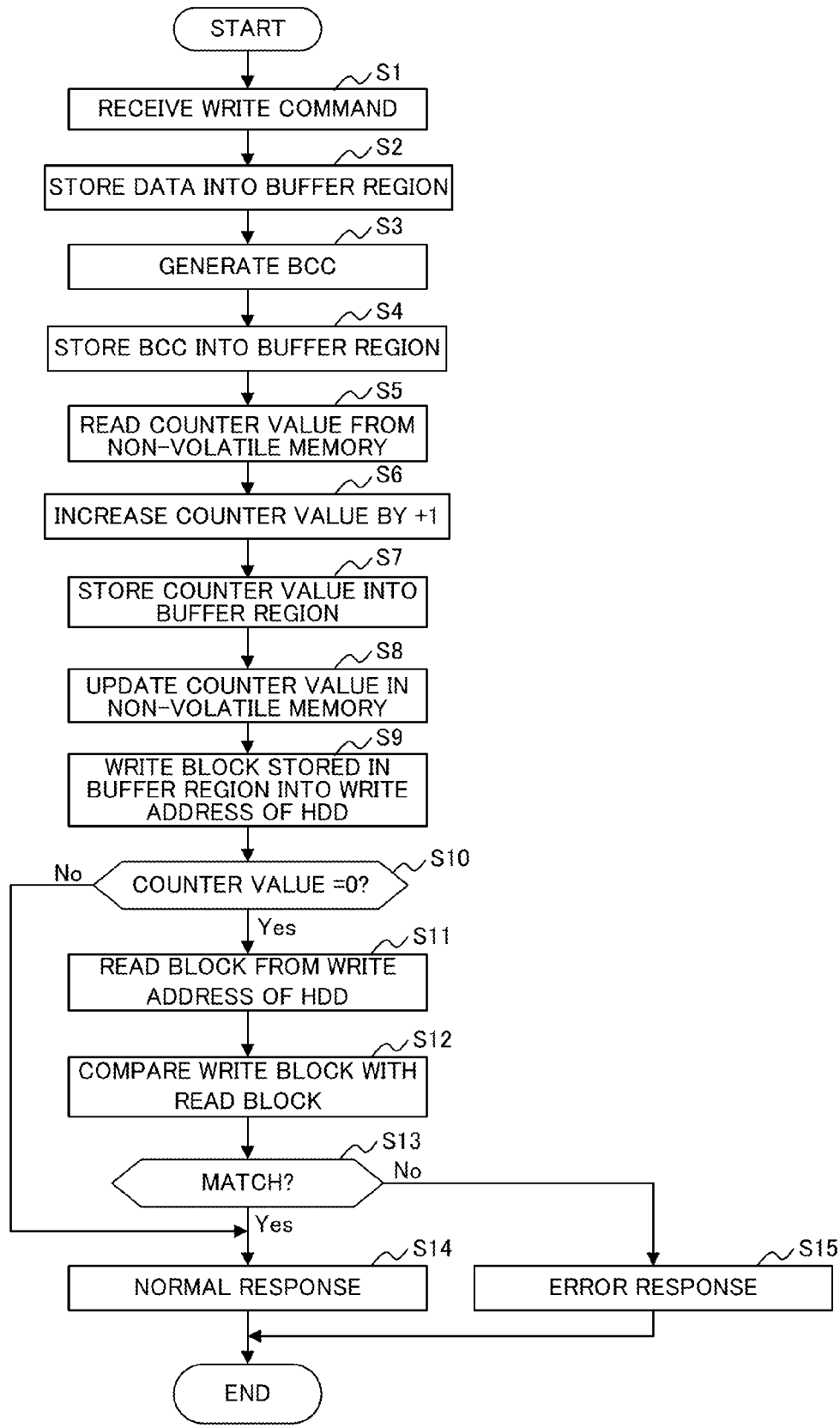
FIG. 3 is a flow diagram denoting an example of a succession of procedural steps of a data writing process to an HDD by the storage apparatus of FIG. 1.
Figure 4:
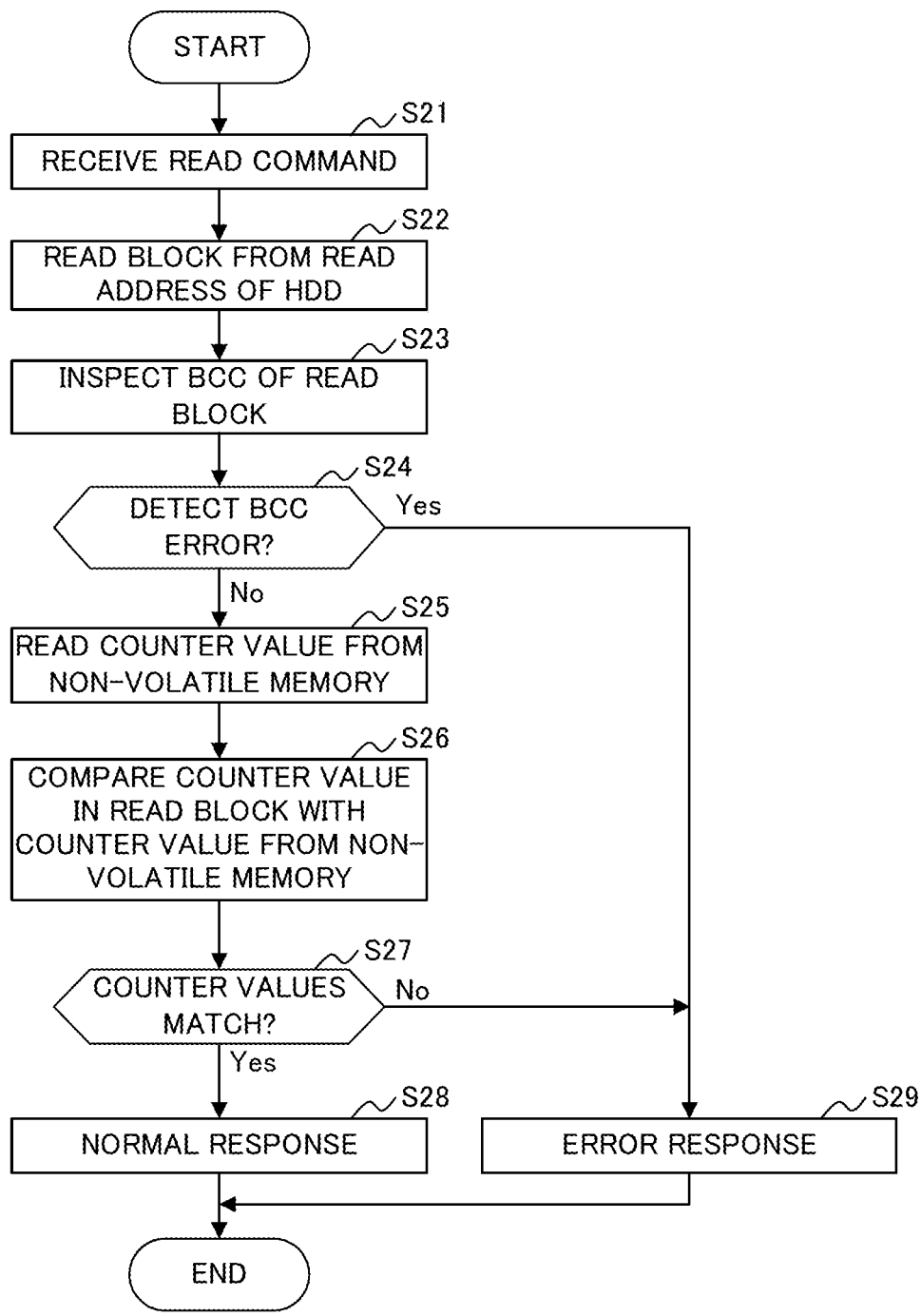
FIG. 4 is a flow diagram denoting an example of a succession of procedural steps of a data reading process from an HDD by the storage apparatus of FIG. 1.

(1-4) Example of Operation of the Information Processing System:

Description will now be made in relation to the examples of operation performed by the information processing system 1 having the above configuration with reference to FIGS. 3 and 4. FIG. 3 is a flow diagram illustrating an example of a succession of procedural steps of data writing process to the HDD 5 by the storage apparatus 2 of FIG. 1; and FIG. 4 is a flow diagram illustrating an example of a succession of procedural steps of data reading process from the HDD 5 by the storage apparatus 2 of FIG. 1.

(1-4-1) Examples of Writing Process:

To begin with, the operation of the writing process will now be described with reference to FIG. 3.

As illustrated in FIG. 3, when the host device 3 issues a write command and the storage apparatus 2 receives the write command (step S1), the command processor 11 notifies the block data generator 13a of the write data and the write data directed by the write command.

The block data generator 13a stores the write data, serving as the data 21a, into the buffer region 21 (data buffer) (step S2). The block data generator 13a generates a BCC 21b including the write address on the basis of the write data and the write address (step S3), and stores the generated BCC 21b into the buffer region 21 (BCC buffer) (step S4).

Next, the block data generator 13a instructs the counter manager 12 to obtain, from the non-volatile memory 6, the counter value 6a corresponding to the block 51 of the writing target indicated by the write address. Then the counter manager 12 reads the counter value 6a from the non-volatile memory 6 (step S5), increases the read counter value 6a by one (step S6), and outputs the increased counter value 6a to the block data generator 13a. The block data generator 13a stores the counter value 6a received from the counter manager 12, serving as a counter value 21c, into the buffer region 21 (step S7).

The counter manager 12 updates the counter value 6a stored in the non-volatile memory 6 and corresponding to the block 51 of the writing target by increasing by one (step S8). In cases where the counter value 6a reaches the predetermined value ($2^n$) by increasing by one in either of steps S6 and S8, the counter manager 12 resets the counter value 6a that reaches the predetermined value ($2^n$), to the initial value.

After that, the write processor 13b writes the block data 211 (write block data) being generated by the block data generator 13a and being stored in the buffer region 21 (block buffer) into the region of the HDD 5 indicated by the write address (step S9).

After the data writing into the HDD 5 finishes, the counter determiner 13c determines whether the counter value 21c written into the block 51 of the writing target is the initial value (e.g., zero) (step S10). In cases where the counter value 21c is not the initial value (No route of step S10), the counter determiner 13c notifies the command processor 11 of the normal completion of the data writing. The command processor 11 replies to the host device 3 with the normal response (step S14) to terminate the procedure.

On the other hand, the counter value 21c is the initial value (Yes route in step S10), the block data comparer 13d reads the data in the block 51 of the HDD 5 indicated by the write address (step S11). The block data comparer 13d stores the read data, serving as the block data 211 (read block data), into the buffer region 21.

Then the block data comparer 13d compares the write block data in the buffer region 21 with the read block data (step S12) to determine whether the write block data matches the read block data (step S13). In cases where the two pieces of data match (Yes route of step S13), the block data comparer 13d notifies the normal completion of the data writing to the command processor 11. Then, the command processor 11 replies to the host device 3 with the normal response (step S14) to terminate the procedure.

On the other hand, in cases where the two pieces of data do not match (No route of step S13), the block data comparer 13d notifies the occurrence of a writing error to the command processor 11. Then, the command processor 11 replies to the host device 3 with an error response (step S15) to terminate the procedure.

Alternatively, the step S8 of FIG. 3 may be carried out between the steps S4 and S5, which allows omission of step S6.

As described above, in the storage apparatus 2 of the first embodiment, the controller 4 carries out read after write after the data writing to the HDD 5 is completed only when the counter value 21c comes to be the predetermined value. In detail, the controller 4 compares the read block data read from the same address as the write address with the write block data that has been written in the execution of read after write scheme. In cases where the two pieces of data do not match as the result of the comparison, the controller 4 determines that the write address is wrong or lost write has occurred.

With this configuration, even when the counter having a small data volume (n) is used, the controller 4 can detect writing errors that successively occur before and after the counter value 51c is reset. Consequently, the controller 4 can improve the reliability of the writing error inspection, reserving an adequate storing region for the user data (data 51a) in the HDD 5.

(1-4-2) Example of Operation of a Reading Process:

Next, the operation of the reading process will now be described with reference to FIG. 4.

As illustrated in FIG. 4, when the host device 3 issues a read command and the storage apparatus 2 receives the read command (step S21), the command processor 11 notifies the read processor 14a of the read address and the read region directed by the read command.

The read processor 14a specifies the block 51 of the HDD 5, serving as the reading target, on the basis of the read address and the read region, and reads information in the block 51 of the reading target (step S22). The read processor 14a stores the information read from the block 51 of the reading target as block data 211 (read block data) into the buffer region 21 (block buffer).

After that, the BCC determiner 14b carries out BCC inspection on the read block data on the basis of the read address and the BCC 21b included in the read block data stored in the buffer region 21 (step S23). In cases where a BCC error is detected (step S24 and Yes route of step S24), the BCC determiner 14b notifies the command processor 11 that a writing error has occurred in the latest writing into the block 51 of the reading target. Then, the command processor 11 replies to the host device 3 with an error response (step S29) to terminate the procedure.

In contrast, in cases where no BCC error is detected in step S24 (No route in step S24), the counter determiner 14c instructs the counter manager 12 to obtain, from the non-volatile memory 6, the counter value 6a corresponding to the block 51 of the reading target. Responsively, the counter manager 12 reads the counter value 6a from the non-volatile memory 6 (step S25), which is then output to the counter determiner 14c. The counter determiner 14c compares the counter value 21c in the read block data with the counter value 6a received from the counter manager 12 (step S26), and determines whether the two counter values match (step S27).

In cases where the counter value 21c matches the counter value 6a (Yes route of step S27), the counter determiner 14c notifies the command processor 11 that the read block has been correctly read with the read block data. Then command processor 11 replies to the host device 3 with the read block data and a normal response (step S28) to terminate the procedure.

In contrast, in cases where the counter value 21c does not match the counter value 6a (No route of step S27), the counter determiner 14c notifies the command processor 11 that a writing error has occurred in the latest writing into the block 51 of the reading target. Then, the command processor 11 replies to the host device 3 with an error response (step S29) to terminate the procedure.

The storage apparatus 2 of an example of the first embodiment carries out the data writing process into and the data reading process from the HDD 5 along the above procedures.

(2) Example of the Hardware Configuration

Next, the hardware configuration of the controller 4 of FIG. 1 will now be detailed with reference to FIG. 5, which illustrates an example of the hardware configuration of the controller 4 of FIG. 1.

Figure 5:
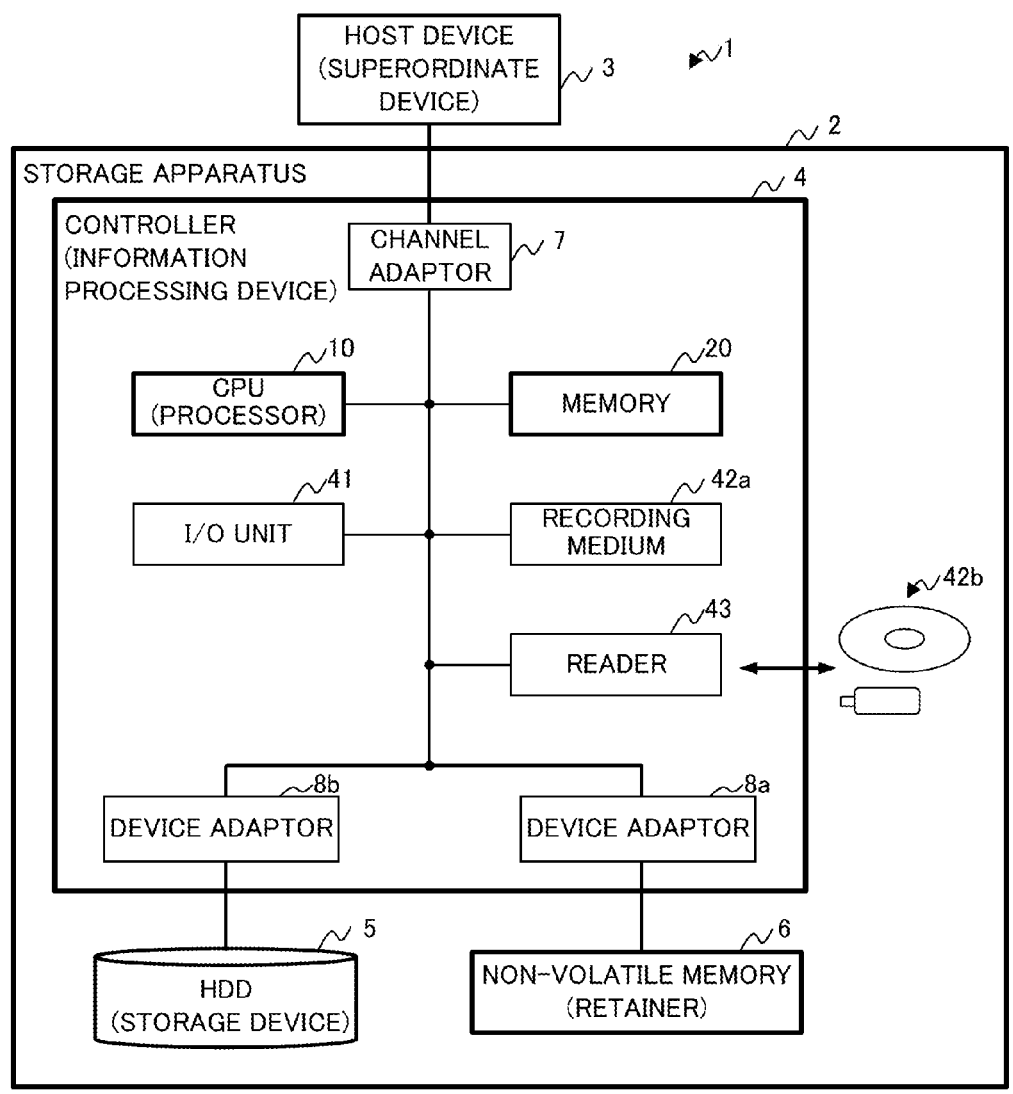
FIG. 5 is a block diagram schematically illustrating an example of the hardware configuration of a controller of FIG. 1.

As illustrated in FIG. 5, the controller 4 includes the CPU 10, the memory 20, the channel adaptor 7, and the device adaptors 8a, 8b that have already appeared in FIG. 1, and may additionally include an Input/Output (I/O) unit 41, a recording medium 42a, and a reader 43.

The I/O unit 41 may include, for example, at least one of an input device such as a mouse or a keyboard and an output device such as a monitor display or a printer. The I/O unit 41 receives an operation instruction that the operator of the controller 4 makes via the input device and also displays (outputs) the result of the operation of the controller 4 on the output device.

An example of the recording medium 42a is a storing device such as a flash memory and a ROM. The recording medium 42a stores therein various pieces of data and programs. The reader reads data and programs from a computer-readable recording medium 42b. In at least one of the recording media 42a and 42b, the writing inspection program that achieves part or the entire of the function of the controller 4 of the first embodiment may be stored. For example, the CPU 10 expand a program read from the recording medium 42a or the recording medium 42b using the reader 43 on the storing device such as the memory 20 and executes the program. Thereby, the computer (including the CPU 10, the information processing device, and various terminals) achieves the above function of the controller 4.

Examples of the recording medium 42b serving as a non-transitory recording medium, are a flexible disc, an optical disc such as a Compact Disc (CD), a Digital Versatile Disc (DVD), a Blu-Ray disc; and a flash memory such as a Universal Serial Bus (USB) memory and an SD card. Examples of the CD are CD-ROM, CD-R(CD-Recordable), and CD-RW (CD-Rewritable); examples of the DVD are DVD-ROM, DVD-RAM, DVD-R, DVD-RW, DVD+R, and DVD+RW.

The blocks 10, 20, 7, 8a, 8b, and 41-43 are communicably connected to one another via a bus. The above hardware configuration is a mere example and accordingly, the hardware elements of the controller 4 (CPU 10) may be appropriately increased and decreased (e.g., omitting an arbitrary block), divided, integrated by arbitrary combinations. Alternatively, the channel adaptor 7 and the device adaptors 8a, 8b may be disposed outside of the controller 4.

(3) Others

The preferred embodiment of the present invention has been described in detail. The present invention is not limited to specific embodiments, and can be variously deformed and changed in a range which does not deviate from the spirit of the present invention.

For example, the controller 4 of the first embodiment includes the BCC 21b in the block data 211 that is generated on the buffer region 21 in the course of the data writing process into the HDD 5, but the present invention is not limited to this. Alternatively, the BCC 21b may be omitted, and in this case, each block 51 of the HDD 5 includes the data 51a and the counter value 51c. Omission of the BCC 21b allows the controller 4 to omit the BCC determiner 14b and also to omit steps S3 and S4 of FIG. 3 and steps S23 and S24 of FIG. 4.

The first embodiment assumes that the storage apparatus 2 includes a single HDD 5, but the operation of the storage apparatus 2 can be the same even when the storage apparatus 2 includes multiple HDDs 5. In this case, the non-volatile memory 6 satisfactorily retains the counter values 6a corresponding to the multiple blocks 51 for each of the HDDs 5.

The first embodiment assumes that the controller 4 is included in the storage apparatus 2, but the configuration of the information processing system 1 is not limited to this. Alternatively, the controller 4 may be included in each HDD 5 or in the host device 3.

The above description made with reference to FIG. 5 assumes that the controller 4 of the first embodiment includes the I/O unit 41, the recording medium 42b, and the reader 43, but the configuration of the controller 4 is not limited to this. Alternatively, at least one of the I/O unit 41, the recording medium 42b, and the reader 43 may be included in another device, such as the host device 3. With this configuration, the writing inspection program may be forwarded from the other device such as the host device 3 to the controller 4 through a wire or radio, and the CPU 10 may expand the forwarded writing inspection program on the memory 20 and execute the expanded program.

The controller 4 of the first embodiment can control a storage apparatus having various Redundant Array of Inexpensive Disks (RAID) configurations using multiple HDDs 5 in the same manner as performed in the first embodiment.

In the above description, the controller 4 of the first embodiment changes the counter value 6a by adding one to the counter, but the counting manner is not limited to this. Alternatively, the counter value 6a may be changed by decreasing one each time. This case satisfactorily sets the initial value to be $2^n$ and sets the predetermined value to reset the counter value 6a to be 0.

The above first embodiment can improve the reliability of the writing error inspection, reserving an adequate storing region for data storage in a storing device.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A non-transitory computer-readable recording medium having stored therein a writing inspection program for causing a computer to execute a process for writing inspection, the process comprising:
   controlling input and output of data into and from a storage device having a plurality of regions;
   changing a first counter value corresponding to a first region serving as a writing target and being retained in a retainer, the retainer retaining a plurality of counter values, each of the counter values representing a number of times of data writing into each of the plurality of regions;
   obtaining the first counter value of the first region from the retainer;
   generating block data by attaching the first counter value obtained from the retainer to data to be written into the first region;
   writing the block data into the first region;
   when the first counter value in the first region satisfies a predetermined condition, reading the block data from the first region after the writing, and
   comparing the read block data with the block data written into the first region, and when the read block data does not match the written block data, notifying an error.

2. The non-transitory computer-readable recording medium according to claim 1, the process further comprising, when the first counter value of the first region in the retainer reaches a predetermined value in the changing of the first counter value, initializing the first counter value, wherein the predetermined condition includes that the first counter value has been initialized.

3. The non-transitory computer-readable recording medium according to claim 1, the process further comprising:
   obtaining a second counter value corresponding to a second region storing therein data to be read, from the retainer;
   comparing a counter value included in block data read from the second region with the second counter value obtained from the retainer; and
   when the counter value in the block data does not match the second counter value, notifying an error.

4. The non-transitory computer-readable recording medium according to claim 1, the process further comprising generating the block data by including the first counter value into information that is to be used for error detection and that is included in data to be written into the first region.

5. An information processing device comprising a processor that:
   controls input and output of data into and from a storage device having a plurality of regions;
   changes a first counter value corresponding to a first region serving as a writing target and being retained in a retainer, the retainer retaining a plurality of counter values, each of the counter values representing a number of times of data writing into each of the plurality of regions;
   obtains the first counter value of the first region from the retainer;
   generates block data by attaching the first counter value obtained from the retainer to data to be written into the first region;
   writes the block data into the first region;
   when the first counter value in the first region satisfies a predetermined condition, reads the block data from the first region after the writing, and
   compares the read block data with the block data written into the first region, and when the read block data does not match the written block data, notifies an error.

6. The information processing device according to claim 5, wherein:
   when the first counter value of the first region in the retainer reaches a predetermined value in the changing of the first counter value, the processor initializes the first counter value; and
   the predetermined condition includes that the first counter value has been initialized.

7. The information processing device according to claim 5, wherein the processor
   obtains a second counter value corresponding to a second region storing therein data to be read, from the retainer,
   compares a counter value included in block data read from the second region with the second counter value obtained from the retainer, and
   when the counter value in the block data does not match the second counter value, notifies an error.

8. The information processing device according to claim 5, wherein the processor generates the block data by including the first counter value in information that is to be used for error detection and that is included in data to be written into the first region.

9. A method of writing inspection by an information processing device, the method comprising:
   controlling input and output of data into and from a storage device having a plurality of regions;
   changing a first counter value corresponding to a first region serving as a writing target and being retained in a retainer, the retainer retaining a plurality of counter values, each of the counter values representing a number of times of data writing into each of the plurality of regions;
   obtaining the first counter value of the first region from the retainer;
   generating block data by attaching the first counter value obtained from the retainer to data to be written into the first region;
   writing the block data into the first region;
   when the first counter value in the first region satisfies a predetermined condition, reading the block data from the first region after the writing, and
   comparing the read block data with the block data written into the first region, and when the read block data does not match the written block data, notifying an error.

10. The method according to claim 9, further comprising, when the first counter value of the first region in the retainer reaches a predetermined value in the changing of the first counter value, initializing the first counter value, wherein the predetermined condition includes that the first counter value has been initialized.

11. The method according to claim 9, further comprising:
   obtaining a second counter value corresponding to a second region storing therein data to be read, from the retainer;
   comparing a counter value included in block data read from the second region with the second counter value obtained from the retainer; and
   when the counter value in the block data does not match the second counter value, notifying an error.

12. The method according to claim 9, further comprising generating the block data by including the first counter value into information that is to be used for error detection and that is included in data to be written into the first region.

* * * * *